No. 891,522. PATENTED JUNE 23, 1908.
L. W. BRYANT.
VEHICLE WHEEL.
APPLICATION FILED SEPT. 6, 1907.
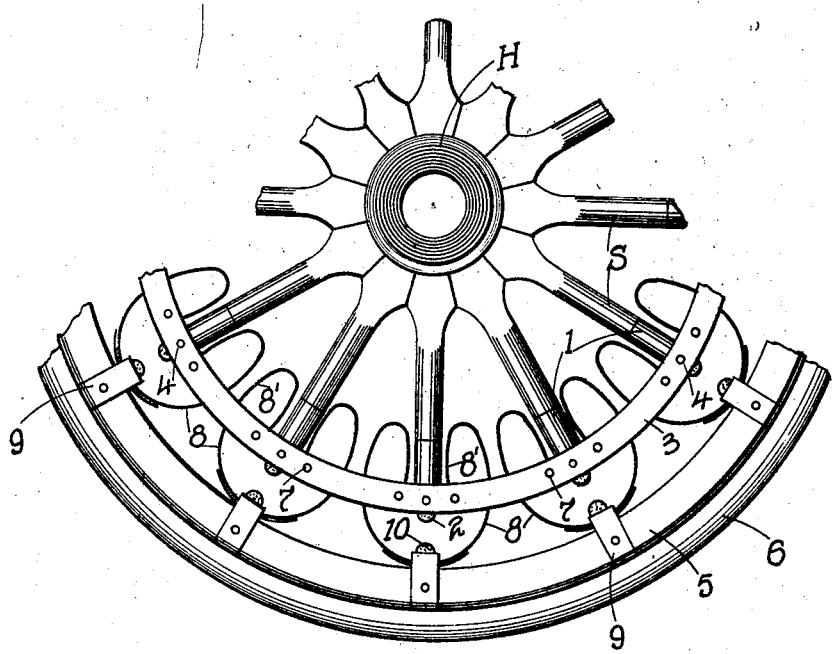
Fig. 1.
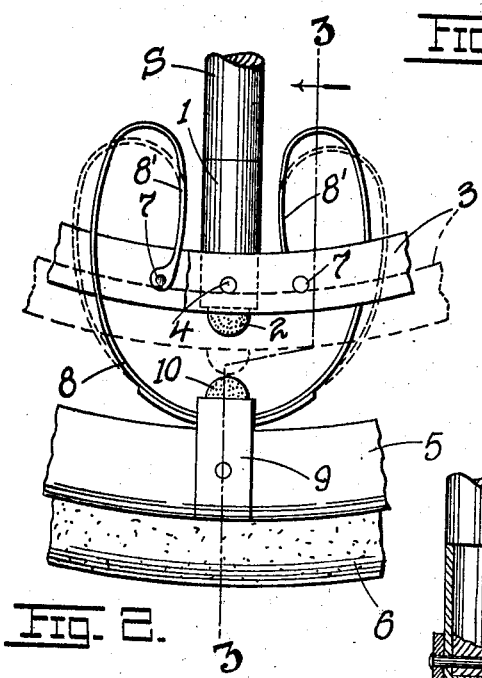
Fig. 2.
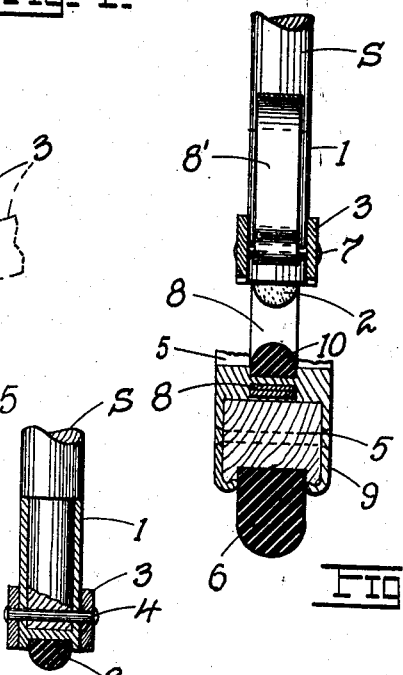
Fig. 3.
Fig. 4.
WITNESSES:
INVENTOR.
Lee W. Bryant
BY
ATTORNEY.

UNITED STATES PATENT OFFICE.

LEE W. BRYANT, OF ST. LOUIS, MISSOURI.

VEHICLE-WHEEL.

No. 891,522.

Specification of Letters Patent.

Patented June 23, 1908.

Application filed September 6, 1907. Serial No. 391,668.

*To all whom it may concern:*

Be it known that I, LEE W. BRYANT, citizen of the United States, residing at St. Louis, State of Missouri, have invented certain new and useful Improvements in Vehicle-Wheels, of which the following is a full, clear, and exact description, reference being had to the accompanying drawings, forming a part hereof.

My invention has relation to improvements in vehicle wheels; and it consists in the novel construction of wheel more fully set forth in the specification and pointed out in the claims.

In the drawings, Figure 1 is a face elevation of a portion of a wheel showing my invention applied thereto; Fig. 2 is an enlarged elevation of a limited section of a wheel showing the yielding springs in normal and compressed position; Fig. 3 is a transverse section on the line 3—3 of Fig. 2; and Fig. 4 is a sectional detail of the outer end of the spoke and thimble and buffer carried thereby.

The object of my invention is to provide a wheel which can take the place of the prevailing form of inflated-tire wheel, the improvement being adapted for light and heavy vehicles.

A further object of the invention is, while dispensing with the inflated-tire, to substitute a cushioning device which shall be disposed as nearly as possible along the outer rim of the wheel so that its effects shall resemble as nearly as possible those of the inflated tire.

A further object is to provide a cushioning device which can be readily repaired in the event that any portion thereof is out of order or becomes broken.

The invention possesses further and other advantages better apparent from a detailed description thereof which is as follows:

Referring to the drawings, H, represents the hub of the wheel and S, the spokes thereof. The outer ends of the spokes terminate in thimbles 1 tipped with rubber buffers 2. Disposed on opposite faces of the wheel and secured to and embracing the spokes at their ends are circular bands 3, 3, a pin or screw 4 serving at the same time to secure the thimbles 1. The buffers 2 project beyond the outer circle of the bands 3. Encompassing the spokes, and spaced a suitable distance from the bands 3 is the rim 5, the same serving to carry the tire 6 which is preferably of solid rubber though I am not limited to the composition of the tire.

Spanning the space between the bands 3, on opposite sides of each spoke are pins or screws 7 which serve as anchors for the terminals of the flexed or bowed springs 8, the springs being substantially U-shaped and having inwardly folded terminals 8', directed toward the spokes. The bases of the springs (preferably of double thickness) rest on the inner edge of the rim 5, and are connected thereto by clips 9 which embrace the sides of the rim, their free ends being bent inwardly against the faces of the tire, as shown. The clips are suitably secured to the rim and preferably countersunk so as to be flush with the opposite faces thereof. The base of each clip is equipped with a buffer tip 10 which is radially in line with the tip 2, the buffers being convexed outwardly so as to impinge virtually along a point or line of contact in the event they come together for an abnormal compression of the springs 8 under a heavy load, or in case of a sudden jar. In the turning of the vehicle around a corner or in making a curve, or in the event it is suddenly deflected from a direct course of travel, the springs 8 will naturally yield laterally more or less. This yielding will naturally manifest itself to the highest degree with the springs at the bottom of the wheel, and were it not for the bands 3, this lateral deflection would be still more emphasized, and perhaps to a degree sufficient to affect the connection between the springs and the anchor pins or screws 7. The bands 3 therefore prevent undue lateral displacement of the parts, so that the center line of the rim will practically remain in the general plane of rotation of the wheel, this plane of course passing centrally between the inner faces of the bands 3. The latter, too, preserve the springs from injury by objects with which the wheel may come in contact.

In the event of the breaking of any spring, the same may be readily renewed by the removal of the pins or screws, and a new spring substituted in a few moments. The springs being coupled directly to the rim, their cushioning effect is on the order of an inflated tire commonly in use. The springs 8, while having their ends secured along a circle defined by the outer ends of the spokes, certain portions of the springs extend interiorly to said circle, this arrangement insuring the desired flexibility, and reducing the stiffness of the spring to a minimum. In lieu of individual spokes, the body of the wheel may be any other conventional form as is obvious.

Having described my invention what I claim is:

1. In combination with a wheel having a series of spokes, a rim encompassing the wheel and spaced a suitable distance from the ends of the spokes, bands secured to the opposite faces of the spokes at the ends of the spokes, and U-shaped springs engaging the rim and having their arms passed between the bands on opposite sides of the spokes then bent inwardly towards the spokes and secured with their ends to said bands, substantially as set forth.

2. In combination with a wheel having a series of spokes, a rim encompassing the wheel and spaced a suitable distance from the ends of the spokes, circular bands secured to the opposite faces of the spokes at the ends of the spokes, U-shaped springs having their bases engaging the inner edges of the rim, and disposed between the bands, the ends of the springs being secured between the bands on opposite sides of the spokes, and having portions extending interiorly to the circle defined by the bands, substantially as set forth.

3. In combination with a wheel having a series of spokes, a rim encompassing the wheel and spaced a suitable distance from the ends of the spokes, circular bands disposed on opposite sides of the spokes at the ends thereof, U-shaped springs bearing against the rim and confined between the bands and projecting a suitable distance interiorly of the bands, terminal arms on the springs turned toward the spokes and having their ends secured between the bands on opposite sides of the spokes, clips securing the springs to the rim, and buffers on the clips and spoke-ends respectively, the parts operating substantially as, and for the purpose set forth.

In testimony whereof I affix my signature, in presence of two witnesses.

LEE W. BRYANT.

Witnesses:
EMIL STAREK,
JOS. A. MICHEL.